United States Patent Office 2,932,668
Patented Apr. 12, 1960

2,932,668

PROCESS FOR THE PRODUCTION OF AMINO-ALKYL ETHERS OF ALCOHOLS OF THE AROMATIC-ALIPHATIC SERIES

Herbert Arnold, Bielefeld, Engelbert Kühas, Gadderbaum, and Hans Pohle, Brackwede, Germany, assignors to Asta-Werke Aktiengesellschaft Chemische Fabrik, Brackwede, Germany No Drawing. Application January 22, 1957
Serial No. 635,085

2 Claims. (Cl. 260—570)

This invention relates to a process for the production of aminoalkyl ethers of alcohols of the aromatic-aliphatic series.

It is known that certain aminoalkyl ethers of alcohols of the aromatic-aliphatic series have valuable therapeutic properties. Examples of known commercial products of this series are (β-dimethylamino-ethyl)-benzhydryl ether of the Formula I and β-dimethylamino-ethyl-(4-chloro-α-methyl-benzhydryl) ether of the Formula II:

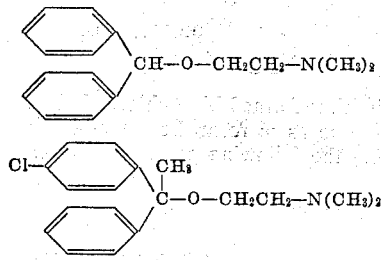

These ethers are produced in a manner known per se by reacting the corresponding benzhydrols with N-substituted alkyl halides in the presence of sodamide or metallic sodium. For the production of benzhydryl ethers of type II, this synthesis has disadvantages, since the tri-substituted carbinols to be used as initial product can only be purified with difficulty. On the technical scale this purification can only be carried out by distillation, which requires the product to be heated to high temperatures, even when reduced pressure is used. Under these conditions, water readily splits off from the tri-substituted carbinol, so that a mixture of the tri-substituted carbinol and the corresponding di-substituted diphenyl ethylene is obtained. This is confirmed by a comparison of the infra-red spectra and the refractive indices of the pure tri-substituted carbinol, of the pure di-substituted diphenyl ethylene and of the product obtained by distillation under reduced pressure. Quite apart from this, the operation with free dialkyl aminoalkyl chlorides, for example dimethyl aminoalkyl chloride, which is necessary with the known process, is unpleasant, owing to the objectionable physiological effects of these substances, particularly when the manufacture is carried out on a technical scale.

It has now been found that these difficulties in the production of β-dialkylamino-ethyl-(4-chloro-α-methyl benzhydryl) ethers can be avoided, and the synthesis can be carried out in a technically advantageous manner by the use of a process wherein 4-chloro-benzophenone dichloride is converted by methods known per se into a 4-chlorobenzophenone-bis-(β-dialkylamino-ethyl) ketal and this ketal is submitted to a Grignard reaction with methyl magnesium iodide.

The process of the invention obviates the necessity of using the sensitive tri-substituted carbinols, makes use of readily available starting materials and proceeds in all stages with good yields.

In a preferred embodiment of the invention, the process is carried out by reacting 4-chlorobenzophenone dichloride according to the following scheme 1:

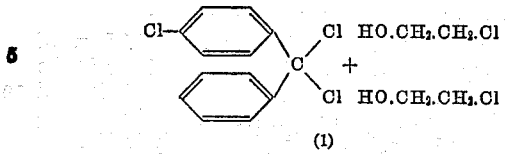

to form bis-β-chloroethyl ketal of the Formula 2

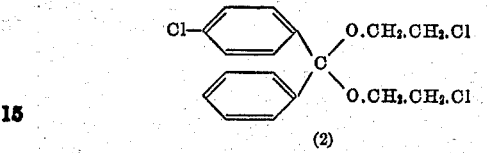

replacing the two chlorine atoms in the β-position by dimethylamine and then, in the basic bis-ether intermediate product of the Formula 3

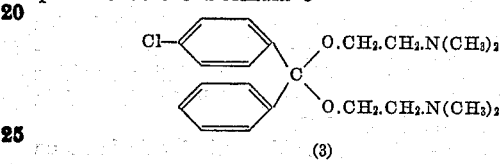

obtained in this manner, replacing one ether radical by a methyl group in the manner previously described by reaction with methyl magnesium iodide. This stage of the process takes place according to the following Equation 4:

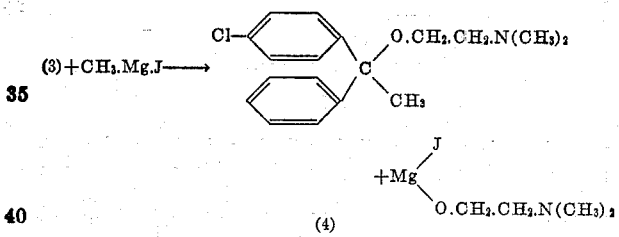

The ethers obtained by the process of the invention can be used therapeutically in a manner known per se in the form of their salts with inorganic or organic acids.

The following example further illustrates the invention.

Example.—The production of β-dimethylaminoethyl-(4-chloro-α-methyl-benzhydryl) ether

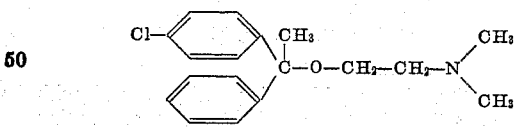

96 g. of magnesium turnings are activated with some iodine in a 4-litre 3-neck flask having a reflux condenser and a stirrer mechanism. The activated magnesium is covered with 300 ml. of absolute ether and then slowly mixed with a mixture of 64 g. of methyl iodide and 800 ml. of ether. After the reaction is complete, 800 ml. of absolute benzene are added and the ether and some of the benzene are extracted substantially in vacuo. The residue should not be exhausted until it becomes dry, since the Grignard reagent easily ignites. The residue is mixed with 600 ml. of benzene and then a mixture of 800 g. of 4-chloro-benzophenone-bis-(β-dimethylamino-ethyl) ketal and 400 ml. of benzene is slowly added while stirring. The mixture is heated for 3 hours to the boiling point and introduced after cooling into a mixture of 400 g. of ammonium chloride and ice. The mixture is shaken with benzene, and the benzene extract is washed with water and dried with sodium sulphate. After the benzene has been distilled off, the product is fractionated in vacuo, B.P. $_{0.5}$ 145–155° C.

Yield: 516 g.=80% of the theoretical, based on 4-chlorobenzophenone-bis-(β-dimethylamino-ethyl) ketal.

The hydrochloride is produced in the usual way.

The 4-chloro-benzophenone-bis - (β - dimethylamino-ethyl) ketal employed above was prepared by reacting 4-chloro-benzophenone dichloride with ethylene chlorhydrin. This reaction was carried out as follows:

649.5 g. of 4-chloro-benzophenone and 625.5 g. of phosphorous pentachloride are heated for 1 hour in the oil bath at 150° C. The phosphorous oxychloride formed is drawn off by means of a water jet vacuum. The residue contains crude 4-chloro-benzophenone dichloride.

The 4-chloro-benzophenone dichloride is mixed without purification with 563.5 g. of ethylene chlorhydrin. After the reaction mixture has stood for a short time, a spontaneous reaction begins with strong evolution of hydrogen chloride; at the end of the reaction the hydrogen chloride is removed by means of a water-jet vacuum, with gentle warming. The ketal which is formed is further worked up as follows, without further purification: the ketal residue is dissolved in 500 ml. ligroin, and this solution is mixed with 1200 ml. of dimethylamine and the resulting mixture heated in an autoclave for 5 hours at 100° C. with stirring. After cooling, the dimethylamine hydrochloride which separates out is filtered off with suction and washed with ligroin, and the solution resulting after the ligroin has been drawn off is fractionated in vacuo. B.P. $_{0.75}$=170–180° C.

Yield: 880 g.=77% of the theoretical calculated on 4-chloro-benzophenone.

What we claim is:

1. A method of producing a β-dialkylamino-ethyl-(4-chloro-α-methylbenzhydryl)-ether having the following general formula:

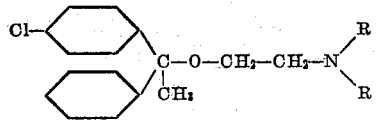

wherein R is a lower alkyl radical, which comprises reacting 4-chloro-benzophenone dichloride with ethylene chlorohydrin in a ratio of 2 mols of ethylene chlorohydrin per each mol of said 4-chloro-benzophenone so as to form the corresponding bis-β-chloroethyl acetal having the following general formula:

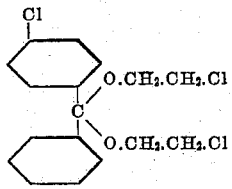

reacting the thus formed bis-β-chloroethyl acetal with a di-, lower alkyl amine so as to form the corresponding basic bis-ether having the following general formula:

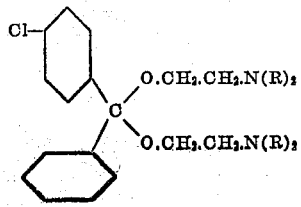

and subjecting said formed basic bis-ether to a Grignard reaction with methyl magnesium iodide so as to form said β-dialkylamino-ethyl - (4 - chloro - α - methylbenzhydryl)-ether.

2. A method of producing β-dimethylamino-ethyl-(4-chloro-α-methylbenzhydryl)-ether having the following general formula:

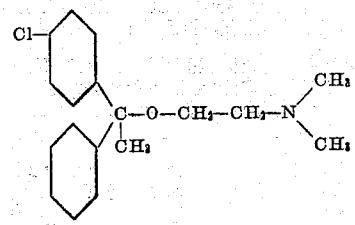

which comprises reacting 4-chloro-benzophenone dichloride with ethylene chlorohydrin in a ratio of 2 mols of said ethylene chlorohydrin per each mol of said 4-chloro-benzophenone so as to form the corresponding bis-β-chloroethyl acetal having the following general formula:

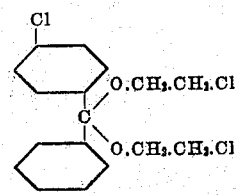

reacting the thus formed bis-β-chloroethyl acetal with dimethylamine so as to form the corresponding basic bis-ether having the following general formula:

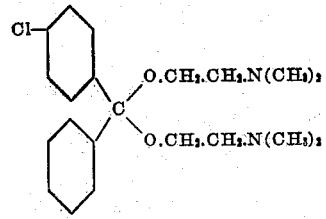

and subjecting said formed basic bis-ether to a Grignard reaction with methyl magnesium iodide so as to form said β-dimethylamino-ethyl-(4-chloro - α - methylbenzhydryl)-ether.

References Cited in the file of this patent
FOREIGN PATENTS

| | | |
|---|---|---|
| 743,043 | Great Britain | Jan. 4, 1956 |
| 1,011,894 | Germany | July 11, 1957 |

OTHER REFERENCES

Kharasch et al.: Grignard Reactions of Nonmetallic Substances (textbook) (1954); page 1044; Prentice-Hall, Inc., N.Y.

Kubo et al.: Chem. Abs. 49, 218 (1955) (orig. reference—Research Rept. Nagoya Ind. Sci. Inst., No. 4, 87–9 (1951)).